T. H. DONLON.
ANIMAL TRAP.
APPLICATION FILED FEB. 16, 1914.
1,121,174.
Patented Dec. 15, 1914.
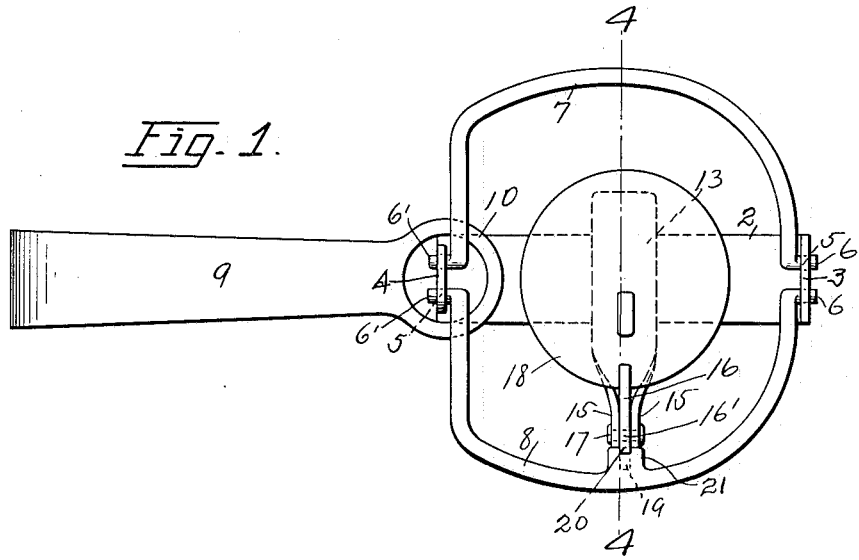
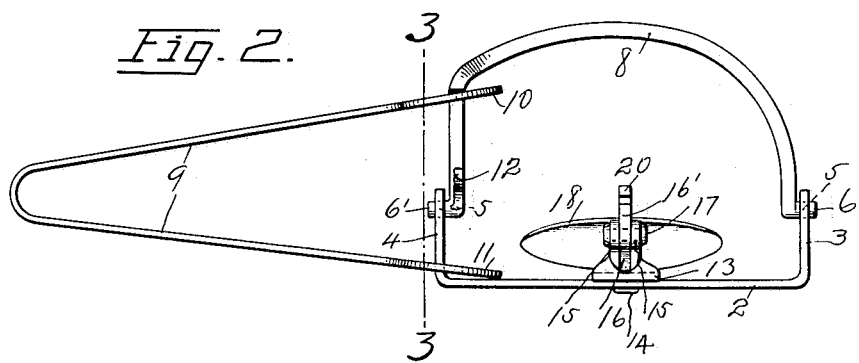
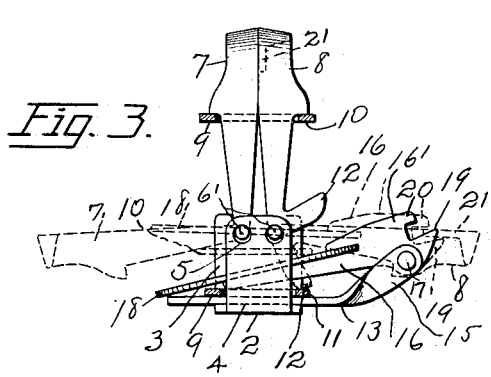
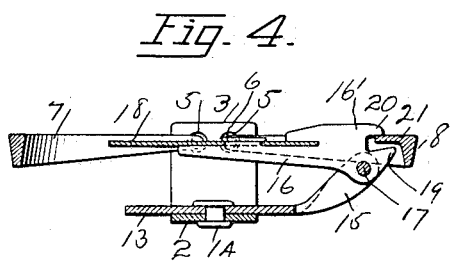
WITNESSES:
INVENTOR.
Thomas H. Donlon
BY
ATTORNEY.

UNITED STATES PATENT OFFICE.

THOMAS H. DONLON, OF SYRACUSE, NEW YORK, ASSIGNOR OF ONE-THIRD TO WILLIAM LOWRY, OF SYRACUSE, NEW YORK.

ANIMAL-TRAP.

1,121,174.  Specification of Letters Patent.  Patented Dec. 15, 1914.

Application filed February 16, 1914. Serial No. 818,908.

*To all whom it may concern:*

Be it known that I, THOMAS H. DONLON, a citizen of the United States, residing at Syracuse, in the county of Onondaga and State of New York, have invented certain new and useful Improvements in Animal-Traps, of which the following is a specification.

This invention relates to improvements in animal traps, and has for its object to provide a trap of the well-known spring-actuated jaw type, which is novel, simple and powerful.

A further object is to provide a novel and simple tripping device associated with the usual bait-plate, whereby by the compressing of the actuating spring, one of the jaws is forced downwardly and engages and lifts the bait-plate into the "set" position, and at the same time becomes automatically locked thereto without requiring the operator to manipulate or touch the said plate in order to effect the setting and locking of the parts. And a further object is to provide means for applying tension to the bait-plate support for rendering the self-locking effective.

The various features and parts of the invention will be understood from the detailed description which follows, and by reference to the accompanying drawing, in which—

Figure 1 is a top plan view of the trap in set position. Fig. 2 is a side view of the trap in released or unset position. Fig. 3 is a vertical cross section, taken on line 3—3 of Fig. 2 in which the full lines show the parts in released position; the dotted lines showing the position of the parts when the trap is set. Fig. 4 is a cross-section, taken on line 4—4 of Fig. 1 showing more clearly the setting and locking features.

In the drawing, 2 represents the base-plate having bent-up ends 3 and 4, each of which is provided with two perforations 5, in which the trunnions 6 and 6' of the jaws 7 and 8 are pivoted. The jaws are closed and held in the closed position shown in Figs. 2 and 3, by the power of a spring 9, which is bent upon itself and its ends are provided with loops or eyes 10 and 11, which respectively encircle the jaws, and the inner end 4 of the base plate.

12 represents a lug or arm preferably integral with the jaw 8, which projects laterally and upwardly from the trunnion 6', and is in the path of, and is adapted to be engaged by, the loop 10 of the spring 9 when the latter is depressed for setting the trap. By the provision of the lug 12 the jaw 8 is forced downwardly a measured distance, and at the same time the said jaw is subjected to a certain pressure which aids in the automatic setting of the trap, as will be presently explained.

13 represents a cross-plate, which is secured to the base-plate by a rivet 14. The outer end of the plate 13 is split and the arms are given a half-twist for bringing their sides parallel, thus providing a fork 15, between which is pivoted a trigger or lever 16 by a pin 17.

18 represents the usual bait plate or pan, which is secured to the trigger 16, and is disposed over the center of the base-plate. The pivoted end 16' of the trigger 16 is cut away or notched to provide a point or tooth 19 which projects rearwardly of the pivot pin 17, the top-face of said tooth declining toward the bottom of the notch, and 20 represents a tooth or hook forming the top-side of the notch, which, together with an inwardly projecting lug 21 integrally formed with the jaw 8, constitutes the lock or latch which holds the trap in the set position, shown in Fig. 1.

The arms of the fork 15 of the cross-plate constitute springs, the free ends of which preferably tend to approach toward each other, so as to grip the notched end 16' of the trigger 16 with sufficient tension to hold the bait pan 18 in the elevated (horizontal) position, whenever it is lifted by the downward movement of the jaw 8 acting on the tooth 19. The said tension is necessary in order to prevent the plate 18 from gravitating when the pressure on the spring 9 is relaxed at the end of the final tilting movement of the plate 18. This retention of the plate 18 in the elevated position, by the tension exerted by the fork 15, allows the lug 21 to enter the notch and engage the underside of the tooth 20, before the plate 18 has time to descend to the normal or inclined position, shown in Fig. 2, and also in full lines in Fig. 3. The said tension of the fork 15 also tends to prevent the accidental tripping of the bait-plate 18, by its own weight induced by the jarring or jolting of the trap after it is set for animals. In cold weather it is desirable to set a number of the traps before leaving the house or camp. This may be done conveniently and safely by reason of the provision of the spring-fork 15, as described. The provision of the spring-arms 15 of the cross-plate entirely obviates the necessity of the operator inserting his finger beneath the trap for lifting the bait-plate 18, as in most of the older forms of traps, wherein the bait-plates are loosely pivoted to the cross-plates.

The operation of my improved trap is very simple. The user disposes the trap on the ground or floor and places his foot on the top arm of the spring 9 and depresses the said arm. In descending, the loop 10 of the said arm of the spring engages the hook or lug 12, and thereby forces the jaw 8 downwardly until the lug 21 carried by said jaw engages the point of the tooth 19 of the trigger 16. The further downward movement of the jaw 8, under the pressure exerted by the operator's foot depresses the tooth 19 which lifts the bait plate 18 from the inclined position, shown in Figs. 2 and 3, to the elevated or horizontal position, shown in Fig. 4 and in dotted lines in Fig. 3. The up-lifting of the plate 16 ceases when the lug 12 encounters the loop 11 of the spring (see dotted lines in Fig. 3). During the final downward movement of the jaw 8, the lug 21 follows and engages the inclined top of the tooth 19 until its free or forward end under-laps the locking-tooth 20. The operator may then relax the pressure on the spring 9, and owing to the tension exerted by the spring arms 15 of the cross-plate 13, the bait-plate 18 and its support, the trigger 16, will be held elevated, while the jaw 8 which tends to rise immediately the pressure on spring 9 is relaxed, moves out of engagement with the tooth 19 and engages the underside of the tooth 20, as shown in Fig. 4 and by dotted lines in Fig. 3. The trap is then set ready for the animal to step on or otherwise depress the plate 18, for releasing the jaw 8, and allowing the spring 9 to close both jaws as shown in Figs. 2 and 3.

Having thus described my invention, what I claim, is—

1. An animal trap, including a base-plate, an actuating-spring, jaws pivoted to said plate, one of said jaws provided with a lug engaged by said spring for opening said jaw a measured distance, said jaw having a second lug, a bait-plate, a lever supporting said plate, one end of said lever having an actuating-tooth engaged by said second lug for tilting the bait-plate and a locking-tooth subsequently engaged by said second lug for holding said bait-plate in set position, and a spring support for said lever adapted to apply tension for permitting the automatic setting of the bait-plate and for preventing the accidental tripping of said bait-plate.

2. An animal trap, including a base-plate, an actuating spring, jaws pivoted to said plate, one of said jaws provided with a lug adapted to be engaged by said spring for opening said jaw a measured distance, said jaw having a second lug, a bait-plate, a trigger supporting said plate, one end of said trigger notched to provide an actuating-tooth for engagement with said second lug for tilting said bait-plate, and a locking-tooth for engagement by said second lug for holding the bait-plate in set position, and means for applying tension to said trigger for permitting the automatic setting of the bait-plate and for preventing the accidental tripping of said plate.

3. An animal trap, including an actuating-spring, a pair of jaws, one of said jaws provided with a lug adapted to be engaged by said spring for opening said jaw a measured distance, said jaw having a second lug, a bait-plate, a lever, one end of said lever supporting said plate, the other end of said lever having an actuating-tooth engaged by said second lug for tilting the bait-plate and a locking-tooth engaged by said second lug for holding said bait-plate in the set position, and a spring-fork pivotally supporting said lever and applying its tension for first permitting the automatic setting and then preventing the accidental tripping of said bait-plate.

In testimony whereof I affix my signature in presence of two witnesses.

THOMAS H. DONLON.

Witnesses:
HOWARD V. RULISON,
HARRY DE WALLACE.